United States Patent
Radez (10) Patent No.: US 9,959,113 B2
(45) Date of Patent: May 1, 2018

(54) MANAGING VERSIONS OF SOFTWARE PACKAGES

(75) Inventor: Daniel P Radez, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 1249 days.

(21) Appl. No.: 13/037,363

(22) Filed: Mar. 1, 2011

(65) Prior Publication Data

US 2012/0227030 A1    Sep. 6, 2012

(51) Int. Cl.
G06F 9/44 (2006.01)
G06F 9/445 (2018.01)

(52) U.S. Cl.
CPC ............ G06F 8/71 (2013.01); G06F 9/44536 (2013.01)

(58) Field of Classification Search
CPC ................ G06F 8/68; G06F 8/65; G06F 8/71
USPC .................................................. 717/120–129
See application file for complete search history.

(56) References Cited

U.S. PATENT DOCUMENTS

| | | | |
|---|---|---|---|
| 6,438,749 B1 | 8/2002 | Chamberlain | |
| 7,240,336 B1 | 7/2007 | Baker | |
| 7,512,939 B2 | 3/2009 | Brookner | |
| 7,624,393 B2 | 11/2009 | Egan et al. | |
| 7,657,885 B2 | 2/2010 | Anderson | |
| 7,838,341 B2 | 11/2010 | Krishnan | |
| 8,245,192 B1 * | 8/2012 | Chen et al. | 717/122 |
| 8,527,947 B2 * | 9/2013 | Clemm | 717/121 |
| 2003/0005093 A1 * | 1/2003 | Deboer et al. | 709/220 |
| 2003/0046681 A1 * | 3/2003 | Barturen et al. | 717/177 |
| 2003/0051235 A1 | 3/2003 | Simpson | |
| 2003/0158919 A1 * | 8/2003 | Fomenko | 709/220 |
| 2003/0229890 A1 | 12/2003 | Lau et al. | |
| 2004/0143811 A1 * | 7/2004 | Kaelicke et al. | 717/101 |
| 2005/0210459 A1 | 9/2005 | Henderson et al. | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0050757 A1 * | 3/2007 | van Woerkom et al. | 717/117 |

(Continued)

OTHER PUBLICATIONS

Seth Kelby Vidal, "Systems and Methods for Initiating Software Repairs in Conjuction With Software Package Updates", U.S. Appl. No. 12/714,200, filed Feb. 26, 2010.

(Continued)

*Primary Examiner* — Hang Pan
(74) *Attorney, Agent, or Firm* — Lowenstein Sandler LLP (57) ABSTRACT

Embodiments relate to systems and methods for managing versions of a software package in a development environment. A package distribution module can interface with a set of stages of the development environment to manage the development of multiple versions of software packages. The package distribution module can establish access rights of entities to advance appropriate versions of the software packages to appropriate stages of the development environment. One or more versions of the software packages can be advanced or moved to other stages of the development environment according to the access rights. The package distribution module can establish new access parameters of software packages in response to the one or more versions advancing or moving to other stages, such that appropriate entities have access to advance appropriate versions. The package distribution module can provide production versions of software packages to a package manager for distribution to target machines.

14 Claims, 5 Drawing Sheets

(56) References Cited

U.S. PATENT DOCUMENTS

| | | | |
|---|---|---|---|
| 2007/0089092 A1* | 4/2007 | Schmidt et al. | 717/126 |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |
| 2008/0141240 A1 | 6/2008 | Uthe | |
| 2008/0201705 A1 | 8/2008 | Wookey | |
| 2008/0319999 A1* | 12/2008 | Simpson | G06F 21/604 |
| 2009/0013319 A1 | 1/2009 | Williams et al. | |
| 2009/0037897 A1 | 2/2009 | Dull et al. | |
| 2009/0293043 A1* | 11/2009 | Begel et al. | 717/122 |
| 2009/0300595 A1 | 12/2009 | Moran et al. | |
| 2010/0023933 A1 | 1/2010 | Brryant et al. | |
| 2010/0058308 A1 | 3/2010 | Demshur et al. | |
| 2010/0058314 A1 | 3/2010 | Wang | |
| 2010/0083243 A1 | 4/2010 | Mincarelli et al. | |
| 2010/0095266 A1* | 4/2010 | Novak | G06F 8/71 717/101 |
| 2010/0138454 A1* | 6/2010 | Volkmer | G06F 8/71 707/803 |

OTHER PUBLICATIONS

Seth Kelby Vidal, "Systems and Methods for Diagnostic Notification Via Package Update Manager", U.S. Appl. No. 12/714,268, filed Feb. 26, 2010.

Seth Kelby Vidal. "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidai, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kathy Vidal. "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 8, 2010.

Seth Kelby Vidal, "Systems and Methods for Space Efficient Software Packagemanagement", U.S. Appl. No. 12/610,006, filed Oct. 30, 2009.

* cited by examiner

MANAGING VERSIONS OF SOFTWARE PACKAGES

FIELD

The present teachings relate to systems and methods for managing versions of software packages, and more particularly, to platforms and techniques for isolating versions of software packages among stages of a development environment.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set. In implementations, the package can be stored or encoded as a single file or data object.

Software package update managers exist to help a user initiate and perform software package updates, such as, for example, the "yum" (Yellowdog update manager) package update manager and the Red Hat Network Satellite systems management platform, both available from Red Hat, Inc., Raleigh, N.C., and others. In general, available software package managers are configured to interact with the set of installed packages on a client and with one or more software package repositories, to directly connect to those databases and download available package updates.

The process of managing a software package development through a progression of development stages can be limited by a centralized server. In particular, the centralized server manages software packages in a development environment based on replication and/or duplication of software package versions. As such, customers or other users of a development environment are not able to isolate versions of software packages among the various development stages. Therefore, it may be desirable to provide systems and methods for managing versions of a software package. Further, it may be desirable to provide systems and methods for isolating versions of a software package among stages of a development environment.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for Managing versions of software packages. More particularly, embodiments relate to platforms and techniques for isolating and managing different versions of software packages among stages of a development environment. In embodiments, a package manager or other logic can track and manage the development of one or more software packages and/or updates to those packages in a development environment or on a client, host, target, and/or other machine. The package manager can host or interact with a package distribution module containing logic to interface with resources associated with stages of the development environment, monitor development of software packages in the stages, progress or advance software package versions through the stages, and other functions.

The package distribution module can initiate and/or track a development of software packages in a development environment. In embodiments, the development environment can comprise stages such as, for example, development, quality assurance (QA), staging, production, and other stages. In embodiments, the package distribution module can define access rights for entities to advance or progress the software packages through the development environment. In other embodiments, the package distribution module can progress or advance versions of software packages and/or isolate different versions of the software packages among the stages. For example, the package distribution module can advance a version of a software package to the QA stage after the version passes the development stage, and isolate that version from another version of the software package already in the staging or production stage. In other embodiments, the package distribution module can maintain various versions of software packages in previous stages after other versions of the software package have advanced to further stages. In embodiments, the package distribution module and/or the package manager can enter a software package into production, or update a set of target machines with software packages that are deemed to pass the development environment.

Reference will now be made in detail to exemplary embodiments of the present teachings, which are illustrated in the accompanying drawings. Where possible the same reference numbers will be used throughout the drawings to refer to the same or like parts.

Figure 1A:
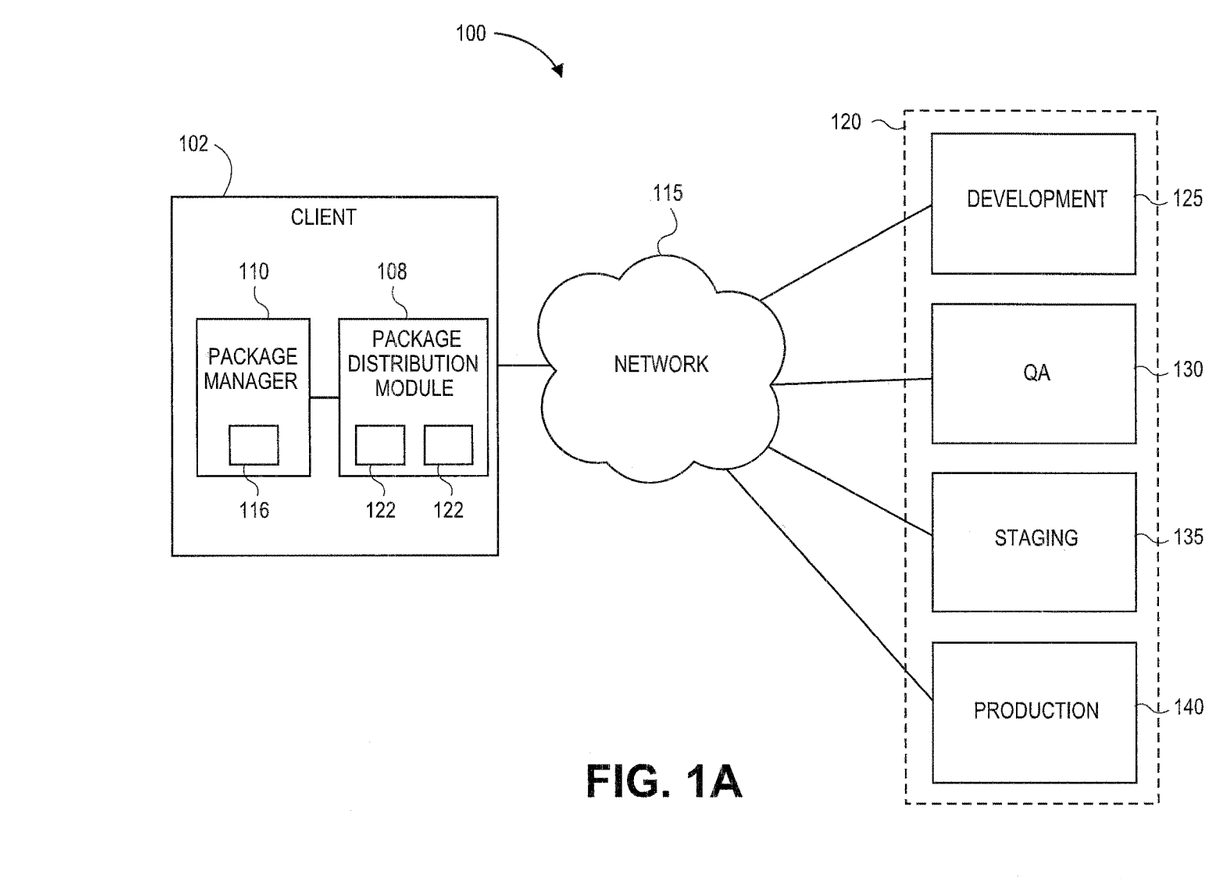
FIG. 1A illustrates an overall network in which systems and methods for managing versions of software packages can be implemented, according to various embodiments.

FIG. 1 illustrates an exemplary system 100 in which systems and methods for managing versions of software packages can be implemented. In embodiments as shown, a client 102 can store, execute, and otherwise host a variety of resources including a package manager 110 and a package distribution module 108. In embodiments, the package manager 110 can be or can include a software application, a utility, an application programming interface (API) to an operating system of the client 102, a service, and/or other local or remote logic or resources. According to embodiments, the package manager 110 can access and manage a set of software packages 116 for the client 102, and other hardware, software, and resources, to run, edit, update, configure, and otherwise manage the set of software packages in software package repositories 122 to be installed on or already installed on target machines of stages in a development environment 120. In embodiments, the package manager 110 can be or can include one or more commercially and/or publicly available package manager applications or resources, such as the "yum" package update manager available from Red Hat Inc. based on or compatible with the Red Hat package manager (RPM) platform, or others. In embodiments, the development environment 120 can comprise a set of stages, levels, phases, or the like, and can be a part of or separate from the client 102 or components thereof. For example, the development environment 120 can comprise development stage 125, quality assurance (QA) stage 130, staging stage 135, production stage 140, and/or other stages.

In embodiments, the software packages in the software package repositories 122 can be or include packages comprising various types of applications, such as, for example, messaging applications, spreadsheet or modeling applications, social networking applications, word processing applications, and/or other applications or utilities, and can in embodiments include an operating system, drivers, and/or components. The software packages in the software package repositories 122 can have an associated set of package attributes which can record file names, versions, dates, software requirements, and/or other attributes related to software package updates installed on the target machines of the development environment 120 and reflected in software packages in the software package repositories 122.

The package manager 110 can communicate with a network interface configured to connect to one or more networks 115, such as the public Internet or other public or private networks, to deliver the set of software packages 116 to the target machines of the development environment 120. Further, the package manager 110 can connect to one or more package distribution modules 108 hosting software package repositories 122 including software package updates, and/or other software or resources.

In embodiments, the package manager 110 can communicate with the package distribution module 108. In embodiments, the package distribution module 108 is separate from the package manager 110, and can manage the development of software packages, such as set of software packages 116, within the development environment 120. The package manager 110 can also interact and/or communicate with the set of software packages 116 and the one or more software package repositories 122 to initiate, configure, test, update, and/or otherwise manage the set of software packages 116 operating on the client 102 and the target machines in the development environment 120. The package distribution module 108 can, for example, provide a user with a set of package update options displayed via a user interface (not shown in figures), such as a graphical user interface or others, to select various test, configuration, and/or other management activities on the set of software packages 116. For example, a user can select to initiate an update on one or more of the set of software packages 116 or install a new package update on the target machines of the development environment 120 via the network 115.

Figure 1B:
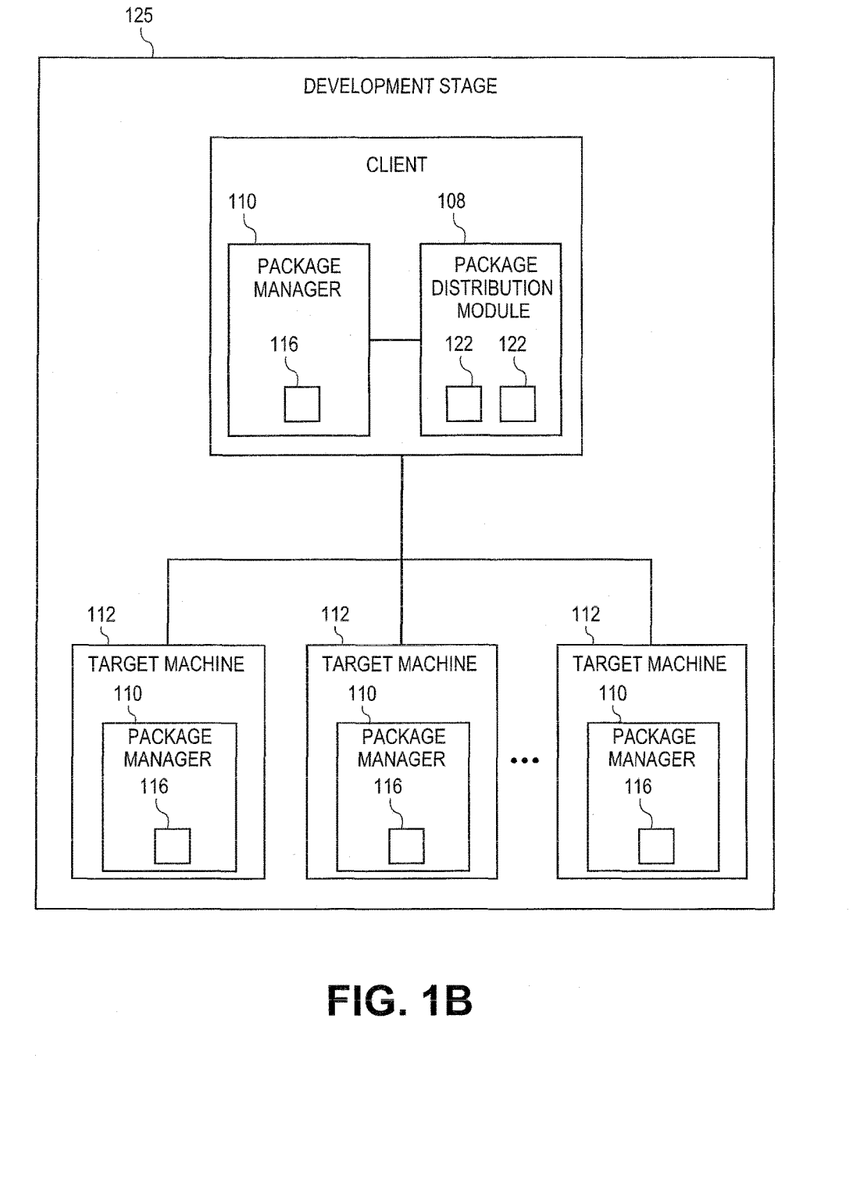
FIG. 1B illustrates components on which systems and methods for managing versions of software packages can be implemented, according to various embodiments.

FIG. 1B illustrates an exemplary stage of the development environment 120. As shown in FIG. 1B, the development stage 125 is illustrated, although it should be appreciated that any of the stages of the development environment 120 can comprise the same or similar components as those illustrated in FIG. 1B.

In embodiments, the development stage can comprise the client 102, as described herein. The client 102 can comprise the package manager 110 and the set of software packages 116, as well as the package distribution module 108 and the software package repositories 122, as described herein. In embodiments, a set of target machines 112 can be configured to communicate with a package distribution module on a client. Further, in embodiments, each of the set of target machines 112 can comprise the package manager 110 and the set of software packages 116, as described herein.

In embodiments, software developers, programmers, testers, and/or the like can access the set of software packages 116 in software repositories 112 on the client 102 to install on the set of target machines 112 in the development stage 125, and/or other stages. The package distribution module 108 on the client 102 can facilitate the movement, advancement, progression, and/or the like of different versions of the set of software packages 116 among the stages of the development environment 120. Further, the package distribution module 108 can isolate the different versions of software package(s) in the software package repositories 112 among the stages of the development environment 120. In embodiments, the package distribution module 108 can establish connection, entitlement, privilege, and/or naming parameters, and/or other parameters, related to the ability of entities to move, advance, or progress software package(s) in the software package repositories 112 among the stages of the development environment 120. For example, the package distribution module 108 can define rights to appropriate developers for a specified version of a software package(s) in the software package repositories 112 to advance the specified version to appropriate stages of the development environment 120.

Figure 2:
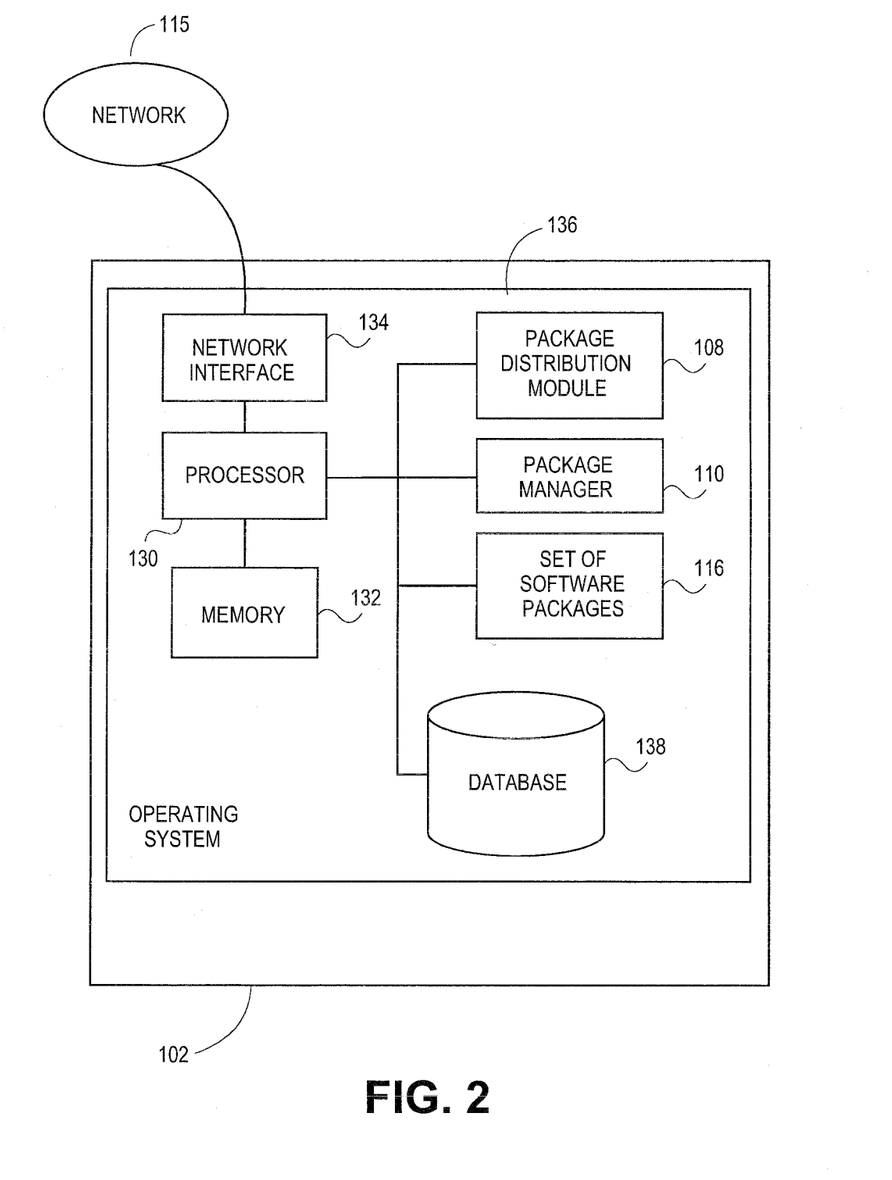
FIG. 2 illustrates exemplary hardware and other resources of a client machine that can be used in systems and methods for managing versions of software packages, according to various embodiments.

FIG. 2 illustrates an exemplary diagram of hardware and other resources that can be incorporated in the client 102 and/or components thereof configured to manage versions of a software application in a development environment. As shown, the client 102 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with storage 138, such as a database stored on a local hard drive, or other networked or persistent storage. In embodiments, the set of software packages 116 can be stored in the storage 138. The processor 130 can further communicate with a network interface 134, such as an Ethernet or wireless data connection, which in turn communicates with one or more networks 115, such as the Internet or other public or private networks. The processor 130 also communicates with the package distribution module 108, the package manager 110, the set of software packages 116, and/or other resources to execute control logic and control the management and/or isolation of software packages. Other configurations of the client 102, including processor and memory resources, associated network connections, and other hardware and software resources are possible.

Figure 3:
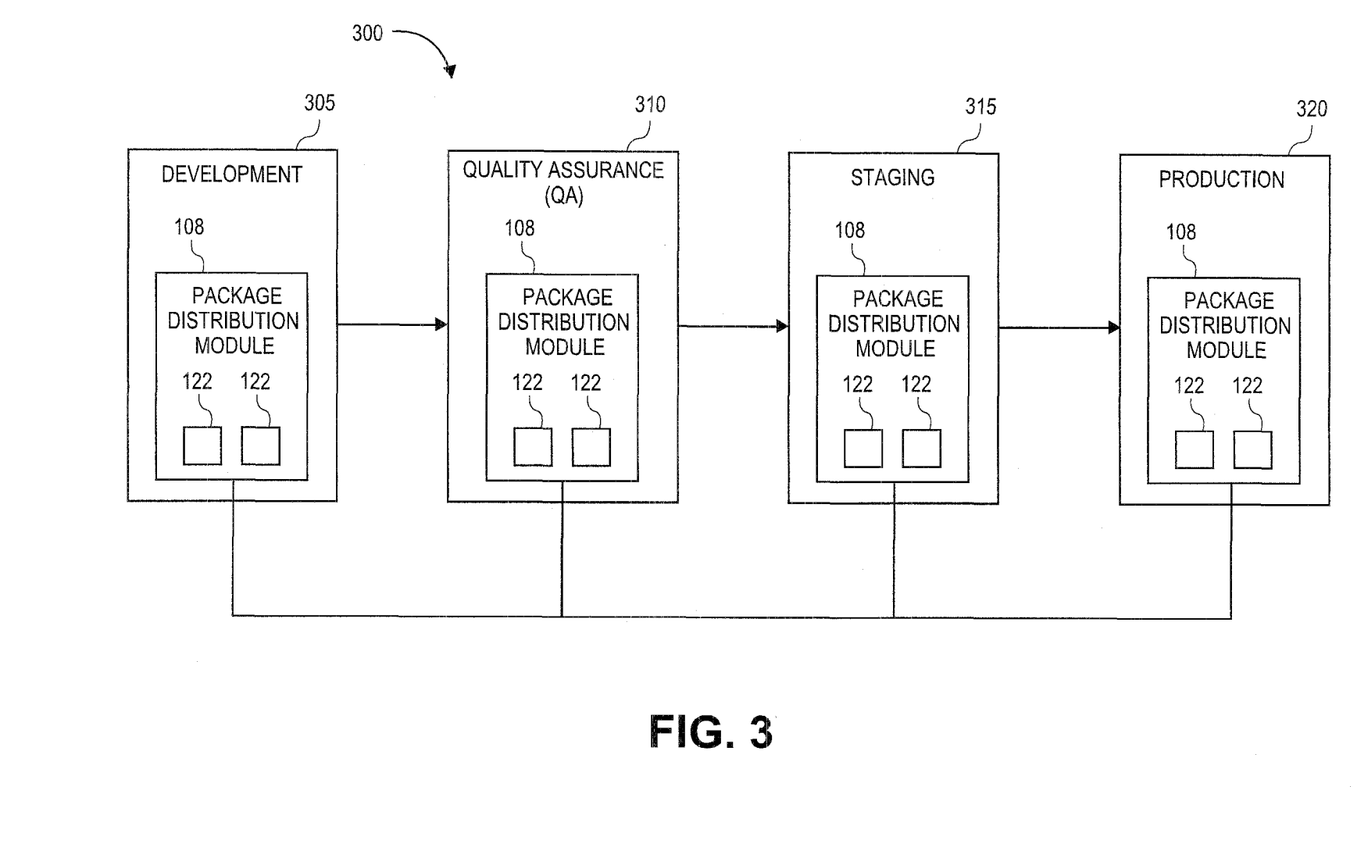
FIG. 3 illustrates an exemplary release environments in systems and methods for managing versions of software packages, according to various embodiments.

FIG. 3 illustrates exemplary release environments 300. It should be appreciated that the release environments 300 depicted in FIG. 3 are merely exemplary and can comprise additional or fewer stages, as well as alternate orders or arrangements. The release environments 300 can comprise tiered stages, phases, levels, or the like, related to software package development. In embodiments, the software packages can be associated with hosted software such as, for example, web sites, web applications, databases, and others, as well as any other application, software, or code capable of being delivered to a client or target machine. As shown in FIG. 3, the release environments 300 can comprise multiple stages: development 305, quality assurance (QA) 310, staging 315, and production 320. It should be appreciated that other stages not shown in FIG. 3 are envisioned. In embodiments, one or more software developers, programmers, testers, or other entities can be associated with each of the stages of the release environments 300. In embodiments, the stages can progress, as shown in FIG. 3, from left to right. For example, once a version of a software package passes QA 310, the software package can progress to staging 315.

In embodiments, the development 305 stage can refer to the stage in which a software package is programmed, coded, or otherwise developed, by, for example, end customers, developers, or other entities. Further, in embodiments, the QA 310 stage can refer to the stage in which a software package is tested or monitored to ensure function and quality. In embodiments, the staging 315 stage can refer to the stage in which the software package and/or applications associated with the software package can be executed, consumed, or monitored in a mirrored or similar environment to a production environment. In embodiments, the production 320 stage can refer to the stage in which the software package and/or applications associated with the software package can be served to end users, clients, or customers.

In embodiments, each of the release environments 300 can comprise the package distribution module 108 that can interface with each stage of the release environments 300. In some embodiments, the package distribution module 108 can distribute software packages related to the development of a software application, appliance, service, or any other type of program code. In embodiments, the package distribution module 108 can distribute multiple versions of software packages to any or all of the stages of the release environments 300. For example, the package distribution module 108 can distribute a version "A" of a software package to QA 310, and a version "B" of the software package to staging 315.

In embodiments, versions of software packages can remain at various stages after the other versions are deemed to pass the particular stage. For example, after a version "2.6" of a software package is passed to the staging 315 stage, a version "2.5" of the software package can remain at the QA 310 stage for further development, testing, and the like. Therefore, multiple versions of a software package can be located, tested, developed, and the like, in multiple stages of the release environments 300. In embodiments, any of the package distribution modules 108 can manage the progression of multiple versions of the software package among the multiple stages.

In embodiments, any of the package distribution modules 108 can distribute a software package to the production 320 stage after the software package is deemed to pass the staging 315 stage. Any of the package distribution modules 108 can generate and provide an operable version of the software package for operation and consumption by end users. For example, any of the package distribution modules 108 can provide the software package to the package manager 110 for delivery to, for example, a cloud-based network.

As an example of managing a development of a software package, assume that a bank has a web application in need of development. The web application allows bank customers to access their accounts via the bank website. The bank can have a team of developers each associated with different stages of a software development environment (e.g. development, QA, etc.). As an example, a version "1.0" of a software package can be in the development stage, a version "2.0" of the software package can be the QA stage, and a version "3.0" of the software package can be in the staging stage. Further, requirements of each of the versions can specify that version "1.0" allows bank customers to access their checking accounts, version "2.0" allows bank customers to access their checking and savings accounts, and version "3.0" allows bank customers to access their checking, savings, and credit card accounts.

A package distribution module, or other logic, can define access rights to advance versions of the software package to other stages for further development. For example, developers of the QA stage can advance version "2.0" from the QA stage to the staging stage. Further, access rights can be established for the version of the software package in response to advancing the software package. For example, the development team associated with the staging stage can be granted rights to advance version "2.0" to other stages after advancement to the staging stage, and the development team associated with the QA stage may no longer have access rights to advance version "2.0" after advancement. It should be appreciated that the example illustrated herein is merely exemplary and that others are envisioned in accordance with the embodiments as described herein.

Figure 4:
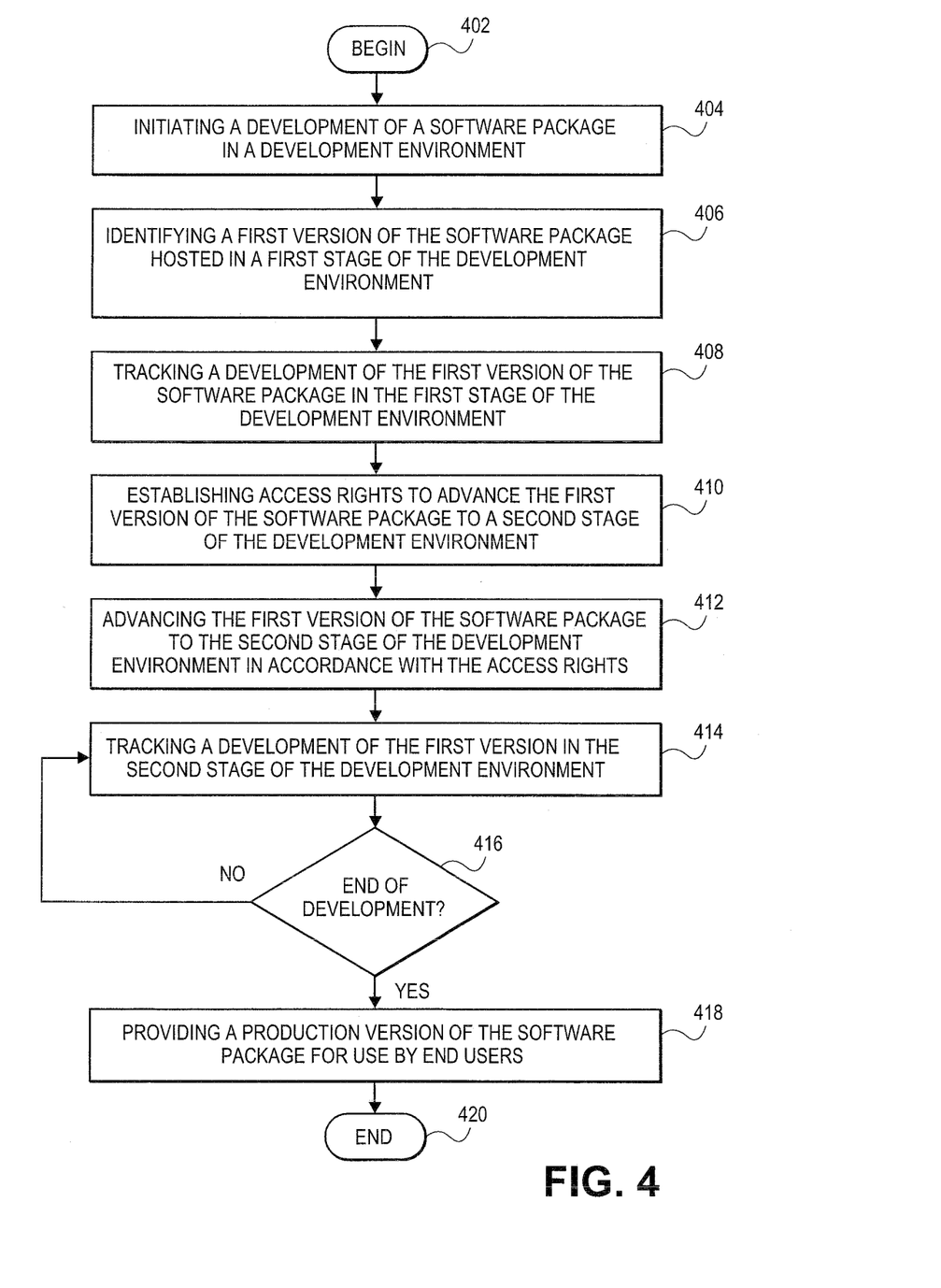
FIG. 4 illustrates a flowchart of software package development that can be used in systems and methods for managing versions of software packages, according to various embodiments.

FIG. 4 illustrates an overall processing flowchart of software package development that can be used in systems and methods for managing versions of a software package, according to various embodiments. In 402, processing can begin. In 404, a development of a software package in a development environment can be initiated. In embodiments, the development environment can comprise a plurality of stages such as, for example, development, quality assurance (QA), staging, production, and others. In 406, a first version of the software package can be identified as hosted in a first stage of the development environment. In some embodiments, the first version of the software package can be respectively provided to the first stage by a package distribution module or other logic.

In 408, a development of the first version of the software package in the first stage can be tracked. In embodiments, software developers, programmers, testers, or other entities or resources associated with the stages can modify, improve, test, and/or otherwise operate on the first version of the software package in accordance with requirements, needs, or other goals. In 410, access rights to advance or progress the first version of the software package to a second stage of the development environment can be established. In embodiments, the package distribution module 108 or other logic can establish permissions, entitlements, or the like to developers or other entities associated with the software package such that first version can be advanced or progressed through the development environment. In some embodiments, access rights can be established whereby developers associated with the first version cannot advance or progress files associated with a second version of the software package, and vice versa.

In 412, the first version of the software package can be advanced to the second stage of the development environment in accordance with the access rights. In embodiments, the developers who obtained access rights to push the first version through the development environment can advance the first version. Further, in embodiments, the second stage can be a further advanced stage of the development environment than the first stage. For example, the first stage can be QA and the second stage can be staging. In other embodiments, the first version can be advanced to the second stage before or after a set of requirements, needs, or goals is met by the developers of the first stage. In 414, a development of the first version in the second stage can be tracked. In embodiments, one or more other versions of the software package can be provided to and/or developed in any of the stages of the development environment.

In 416, a development status of the first version of the software package can be checked. For example, the first version of the software package can complete the production stage of the development environment. If the development of the first version of the software package has ended, processing can proceed to 418 in which a production version of the first version of the software package can be provided for use by end users, for example via a package distribution. In embodiments the production version of the software package can have been promoted through and verified in each stage of the development process. In some embodiments, development on the next version can continue as production version is provided for use. If the development of the first version of the software package has not ended, processing can proceed to 414, in which the development of the first version in the second stage can be tracked. In 420, processing can end.

The foregoing description is illustrative, and variations in configuration and implementation may occur to persons skilled in the art. For example, while embodiments have been described in which a unitary package distribution module 108 is configured to manage software package development, in embodiments, multiple modules or software can interact to control the development, downloading, installation, testing, and other management of software packages. While embodiments have been described in which package update activity is conducted on one client 102, in other embodiments, multiple local or remote targets, clients, and/or other machines can register to package manager 110, package distribution module 108, and/or other logic or resources to receive or perform package update activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   identifying a first stage of a development environment, a second stage of the development environment, a third stage of the development environment, and a fourth stage of the development environment;
   determining a first version of a software package is hosted in the first stage of the development environment;
   determining a second version of the software package hosted in the first stage of the development environment;
   defining a first set of access rights for a first entity, the access rights comprising:
      a first permission indicating that the first entity is permitted to access the first version of the software package and the second version of the software package;
      a second permission indicating that the first entity is permitted to advance the first version and the second version of the software package through the first stage of the development environment, the second stage of the development environment, the third stage of the development environment, and the fourth stage of the development environment;
   defining a second set of access rights for a second entity, the access rights comprising:
      a third permission indicating that a the second entity is permitted to access the first version of the software package and the second version of the software package; and
      a fourth permission indicating that the second entity is not permitted to advance the first version of the software package through at least one of the second stage of the development environment, the third stage of the development environment, or the fourth stage of the development environment, and is permitted to advance the second version of the software package through the at least one of the second stage of the development environment, the third stage of the development environment, or the fourth stage of the development environment;
   receiving, by a processor, a first request from the first entity to access the first version of the software package;
   providing to the first entity, in view of the first permission, access to the first version of the software package in response to the first request;
   receiving, by the processor, a second request from the first entity to advance the first version of the software package from the first stage of the development environment to the second stage of the development environment;
   advancing, in view of the second permission, the first version of the software package from the first stage of the development environment to the second stage of the development environment in response to the second request;
   receiving a third request from the second entity to access the first version of the software package;
   providing to the second entity, in view of the third permission, access to the first version of the software package in response to the third request;
   receiving, by the processor, a fourth request from the second entity to advance the first version of the software package from the second stage of the development environment to the third stage of the development environment;
   denying the fourth request in view of the fourth permission
   receiving a fifth request from the second entity to access the second version of the software package;
   providing to the second entity, in view of the third permission, access to the second version of the software package in response to the fifth request;
   receiving, by the processor, a sixth request from the second entity to advance the second version of the software package from the first stage of the development environment to the second stage of the development environment; and
   advancing, in view of the fourth permission, the second version of the software package from the first stage of the development environment to the second stage of the development environment in response to the sixth request.

2. The method of claim 1, wherein the first stage of the development environment is one of a development stage, a quality assurance stage, a staging stage, or a production stage.

3. The method of claim 1, wherein the second stage of the development environment is one of a development stage, a quality assurance stage, a staging stage, or a production stage.

4. The method of claim 1, wherein the first entity comprises a set of developers associated with the first version of the software package.

5. The method of claim 1, wherein the first entity comprises a set of developers associated with the first stage of the development environment.

6. The method of claim 1, wherein the second entity comprises a set of developers associated with the second stage of the development environment.

7. The method of claim 1, wherein the third stage of the development environment is a production stage that provides a third version of the software package to a set of end users.

8. A system comprising:
a memory to store a set of access rights, the access rights comprising a first stage of a development environment indicating a permission status to access a software package, a second stage of the development environment indicating a permission status to advance versions of the software package through stages of the development environment, a third stage of the development environment indicating a permission status to access the software package, and a fourth stage of the development environment indicating a permission status to advance versions of the software package through stages of the development environment; and
a processor, operatively coupled to the memory, to:
determine a first version of the software package is hosted in the first stage of the development environment;
determine a second version of the software package hosted in the first stage of the development environment;
defining a first set of access rights for a first entity, the access rights comprising:
a first permission indicating that the first entity is permitted to access the first version of the software package and the second version of the software package; and
a second permission indicating that the first entity is permitted to advance the first version and the second version of the software package through the first stage of the development environment, the second stage of the development environment, the third stage of the development environment, and the fourth stage of the development environment;
defining a second set of access rights for a second entity, the access rights comprising:
a third permission indicating that the second entity is permitted to access the first version of the software package and the second version of the software package; and
a fourth permission indicating that the second entity is not permitted to advance the first version of the software package through at least one of the second stage of the development environment, the third stage of the development environment, or the fourth stage of the development environment and is permitted to advance the second version of the software package through at least one of the second stage of the development environment, the third stage of the development environment, or the fourth stage of the development environment;
receive a first request from the first entity to access the first version of the software package;
provide to the first entity, in view of the first permission, access to the first version of the software package in response to the first request;
receive a second request from the first entity to advance the first version of the software package from the first stage of the development environment to the second stage of the development environment;
advance, in view of the second permission, the first version of the software package from the first stage of the development environment to the second stage of the development environment in response to the second request;
receiving a third request from the second entity to access the first version of the software package;
provide to the second entity, in view of the third permission, access to the first version of the software package in response to the third request;
receive a fourth request from the second entity to advance the first version of the software package from the first stage of the development environment to the second stage of the development environment;
deny the fourth request in view of the fourth permission
receive a fifth request from the second entity to access the second version of the software package;
provide to the second entity, in view of the third permission, access to the second version of the software package in response to the fifth request;
receive a sixth request from the second entity to advance the second version of the software package from the first stage of the development environment to the second stage of the development environment; and
advance, in view of the fourth permission, the second version of the software package from the first stage of the development environment to the second stage of the development environment in response to the sixth request.

9. The system of claim 8, wherein the first stage of the development environment is one of a development stage, a quality assurance stage, a staging stage, or a production stage.

10. The system of claim 8, wherein the second stage of the development environment is one of a development stage, a quality assurance stage, a staging stage, or a production stage.

11. The system of claim 8, wherein the first entity comprises a set of developers associated with the first version of the software package.

12. The system of claim 8, wherein the first entity comprises a set of developers associated with the first stage of the development environment.

13. The system of claim 8, wherein the second entity comprises a set of developers associated with the second stage of the development environment.

14. The system of claim 8, wherein the third stage of the development environment is a production stage that provides a third version of the software package to a set of end users.

* * * * *